Fig. 1

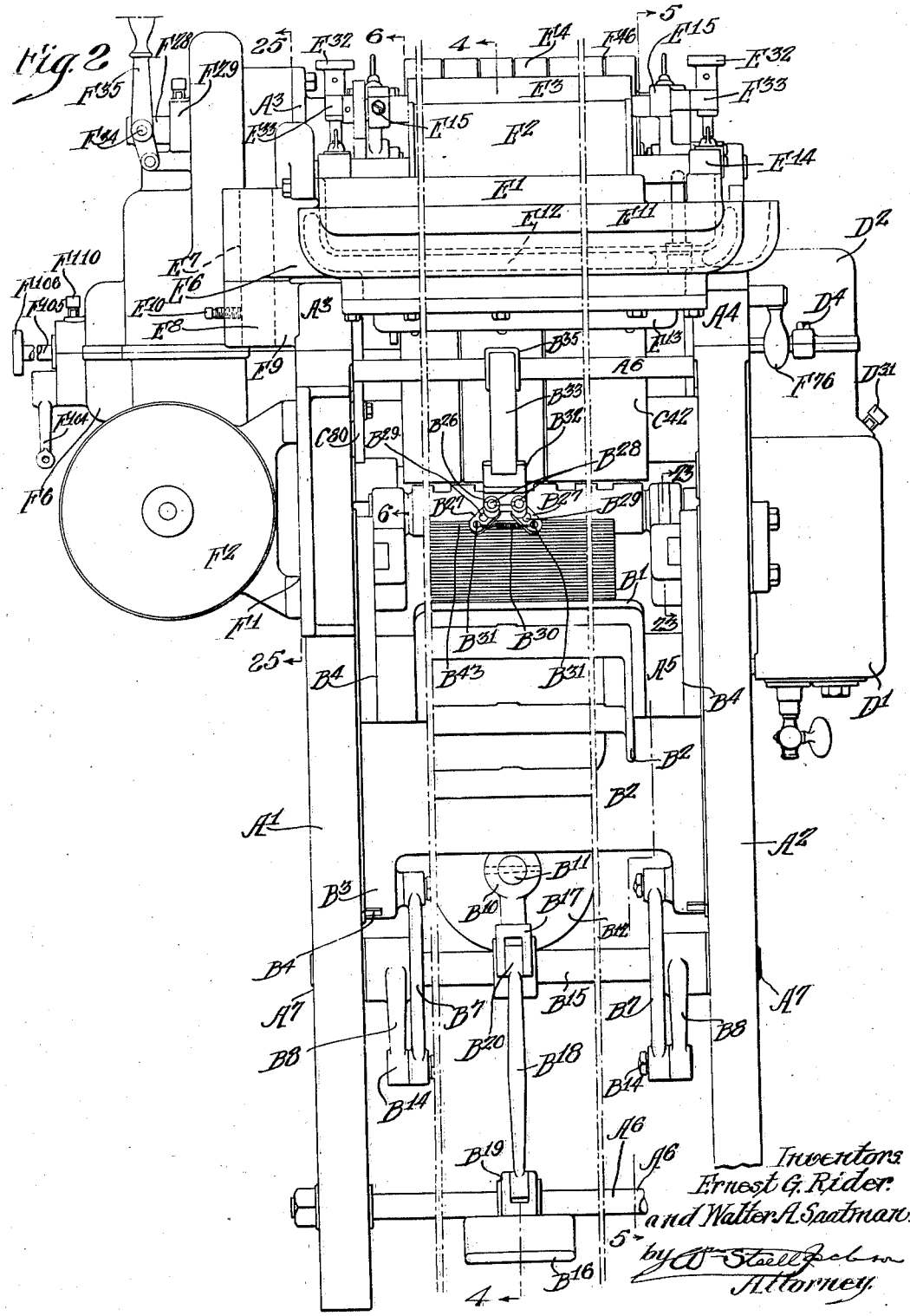

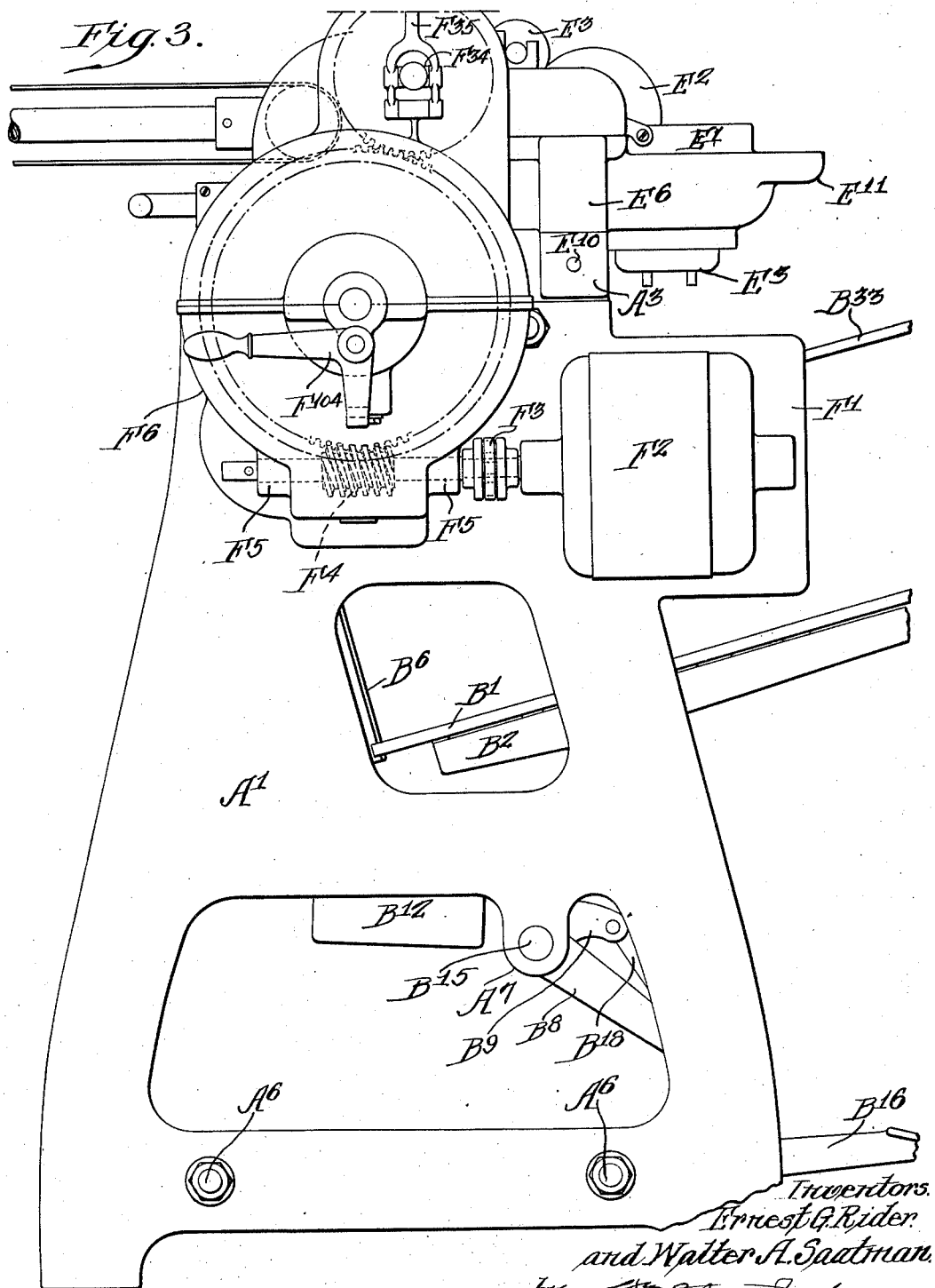

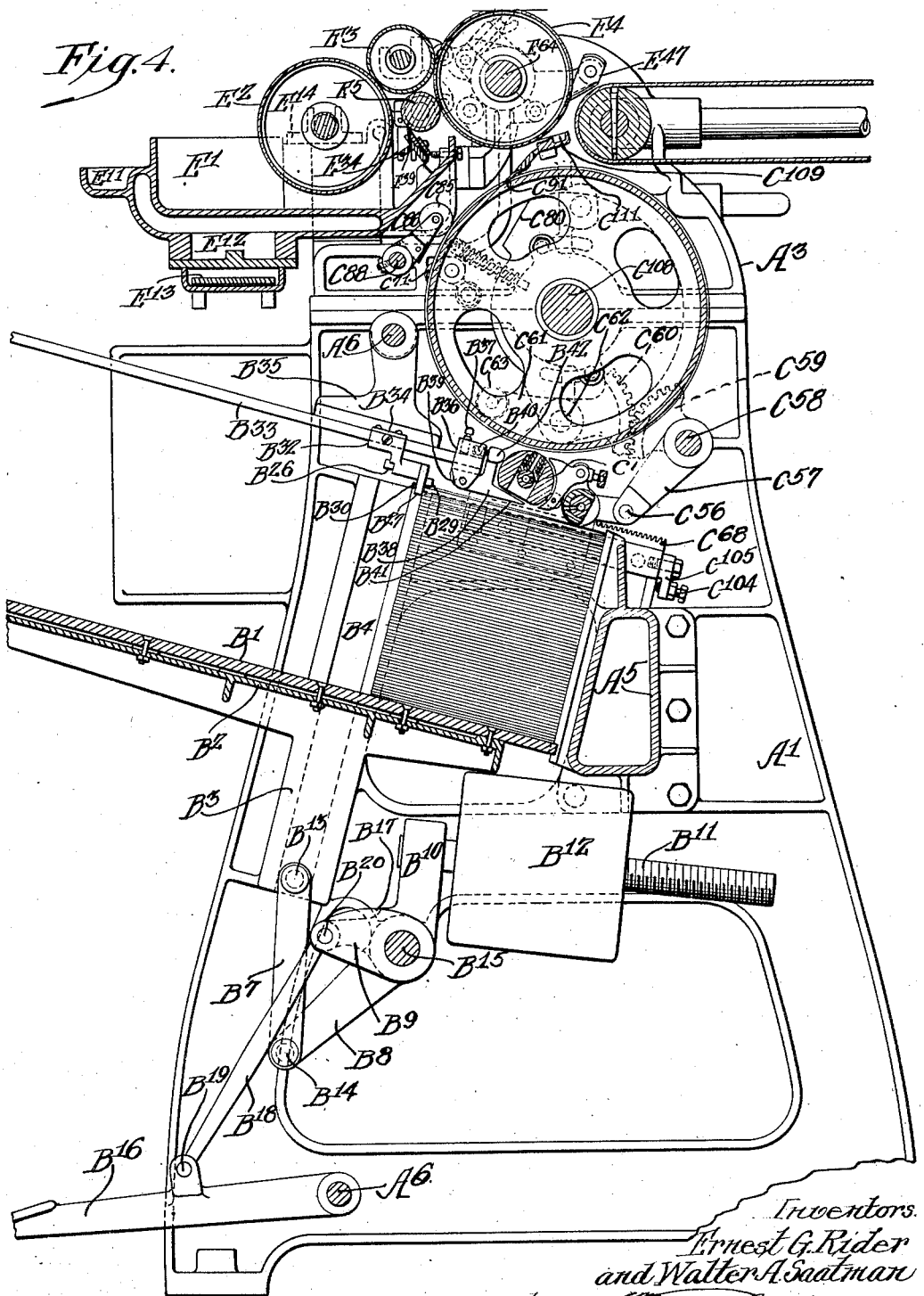

Jan. 21, 1930.  E. G. RIDER ET AL  1,744,244
GLUING MACHINE
Filed June 30, 1923  11 Sheets-Sheet 5
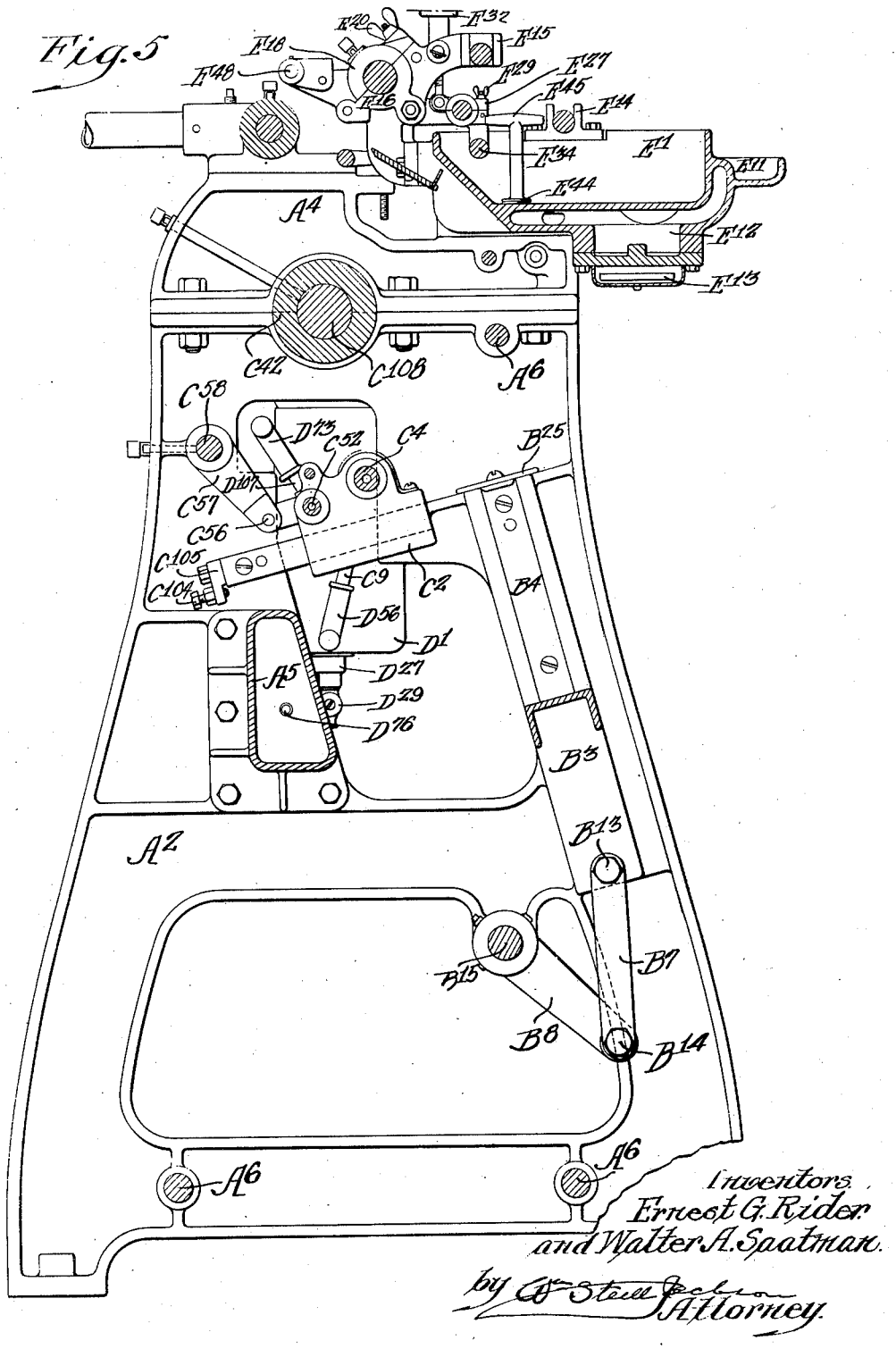

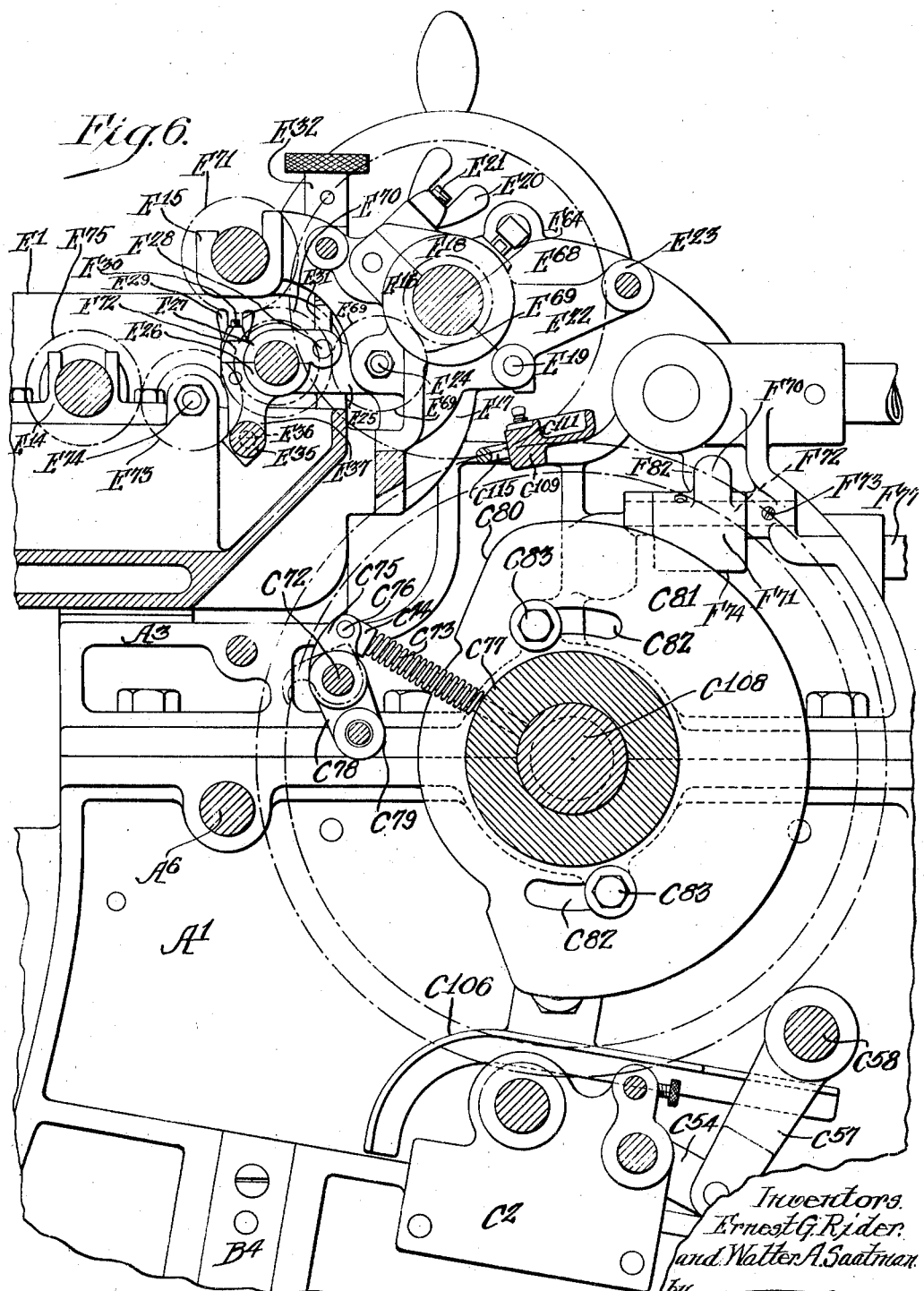

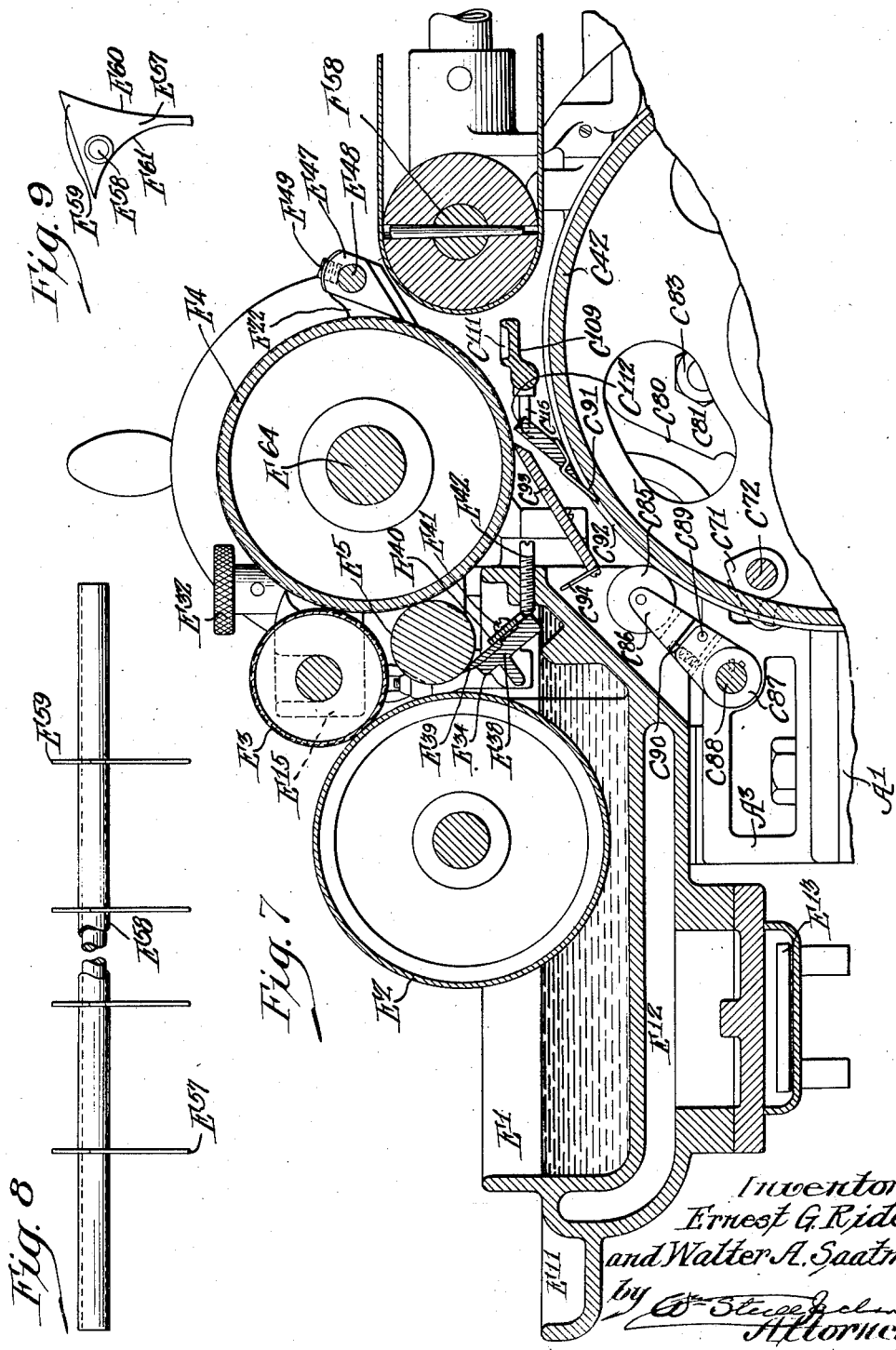

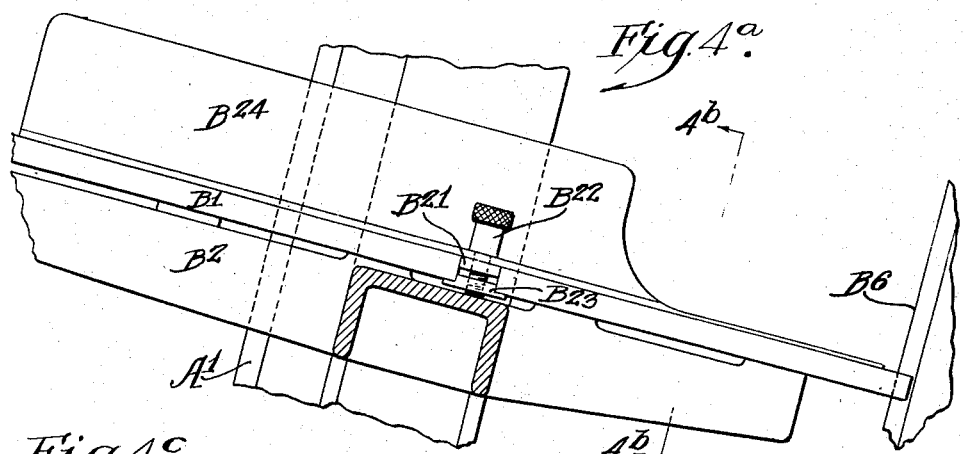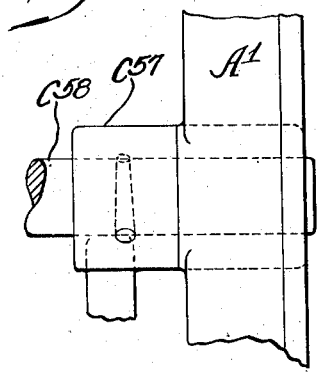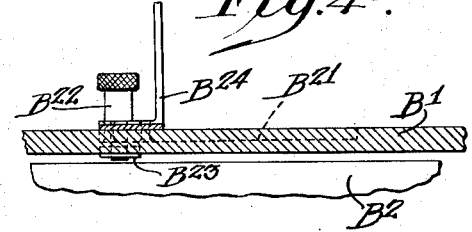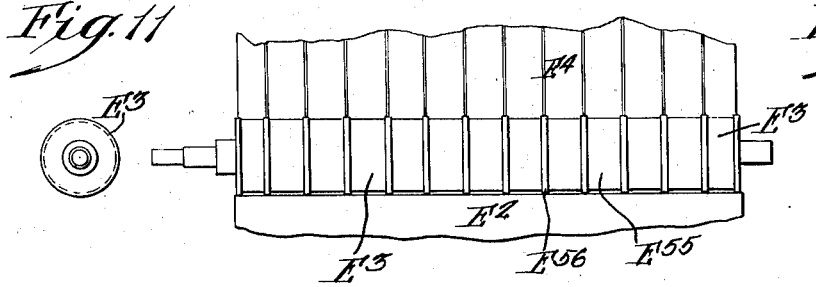

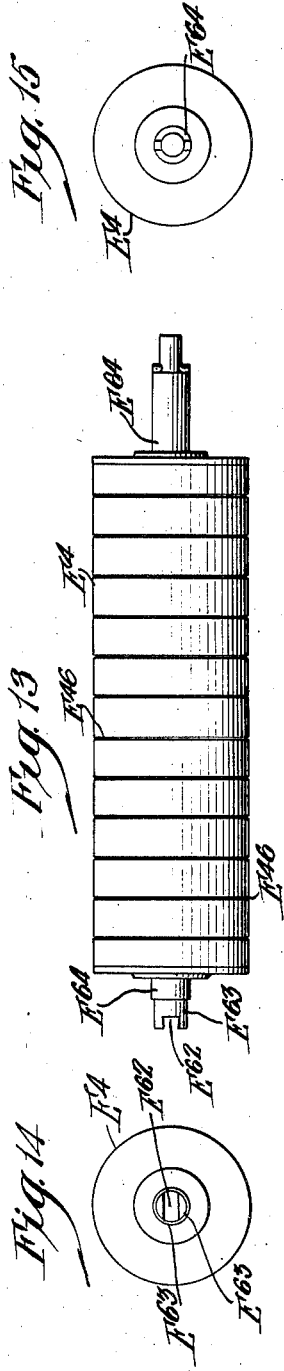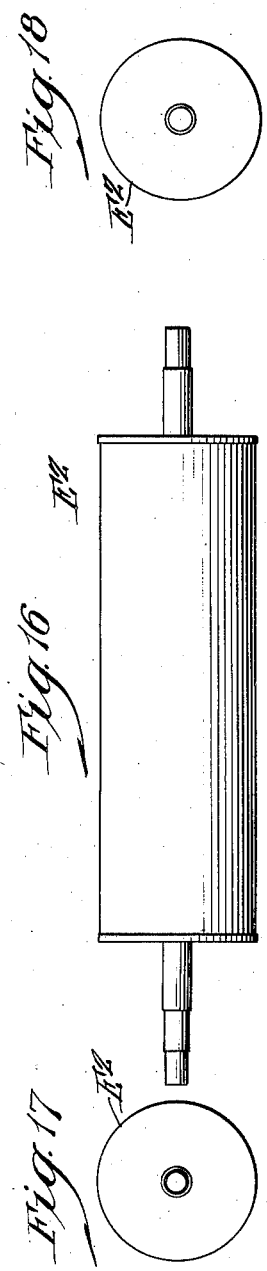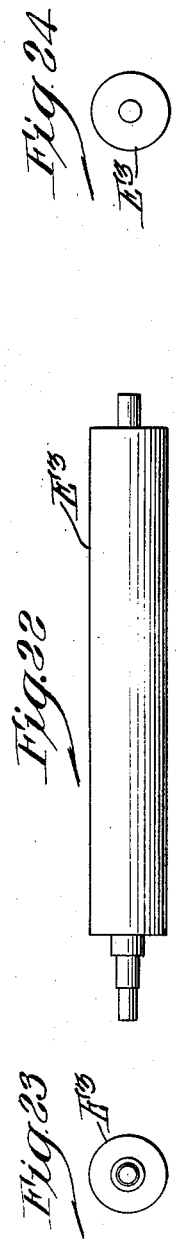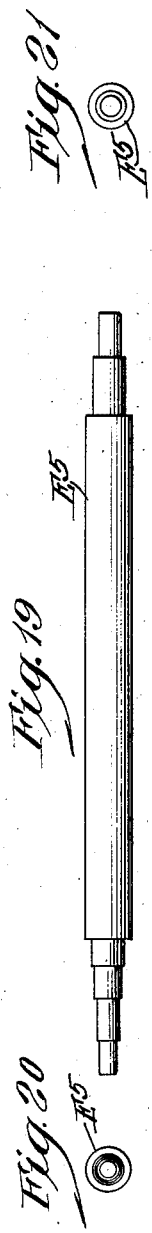

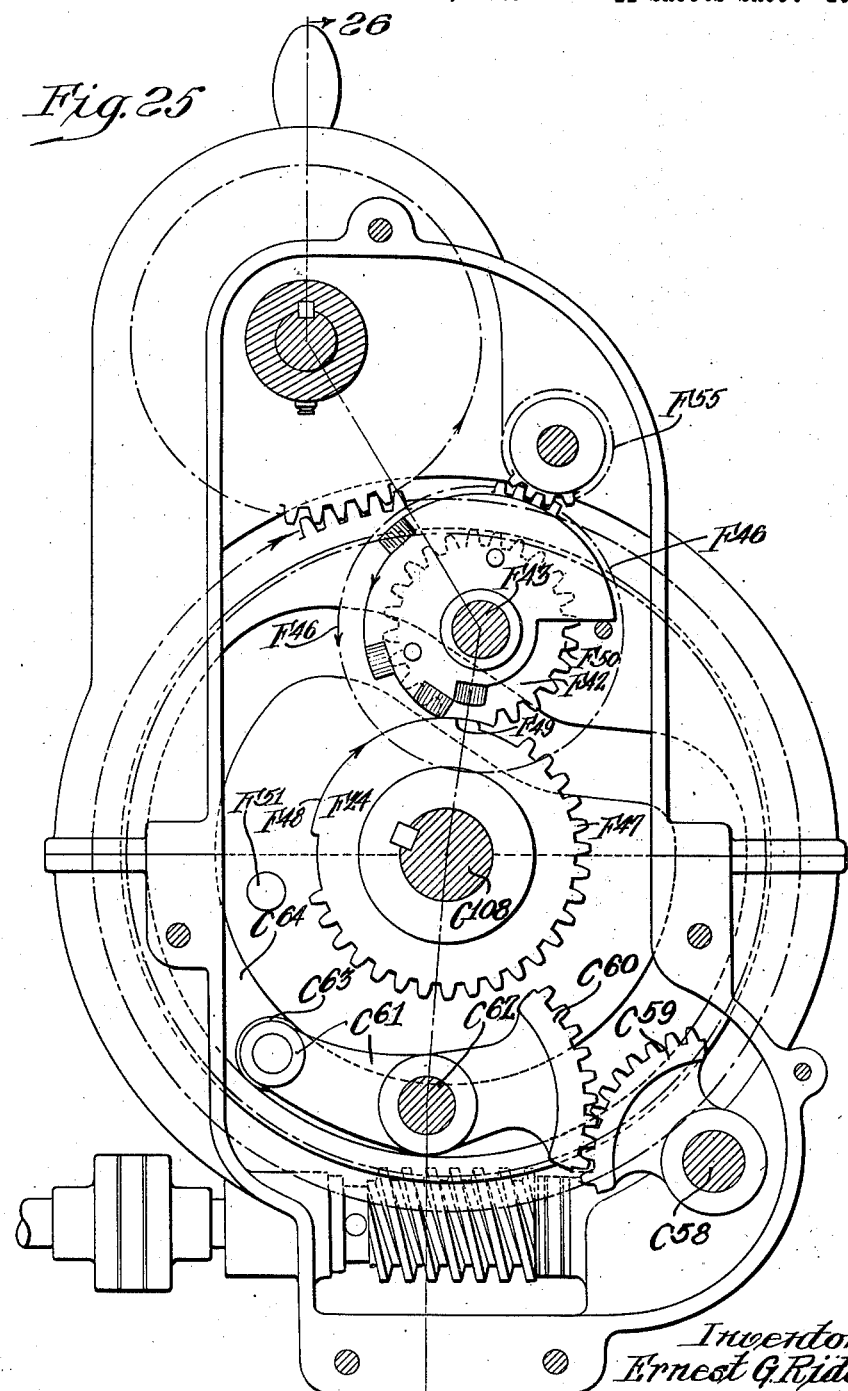

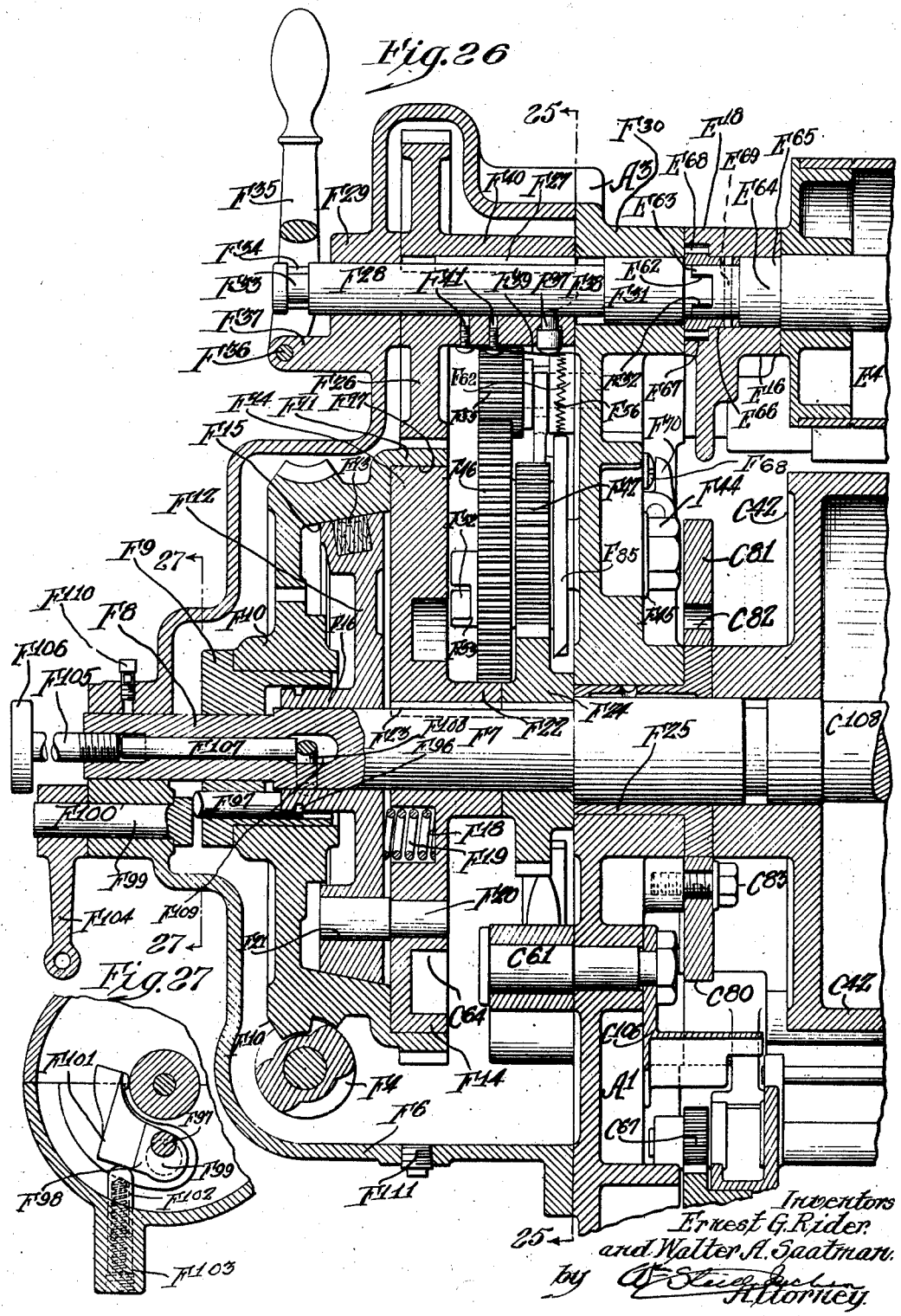

Patented Jan. 21, 1930

1,744,244

UNITED STATES PATENT OFFICE

ERNEST G. RIDER AND WALTER A. SAATMAN, OF PHILADELPHIA, PENNSYLVANIA

GLUING MACHINE

Application filed June 30, 1923. Serial No. 648,747.

Our invention relates to machines for gluing and delivering sheets of paper for application usually to boxes in box making machines and then called wraps, but capable of broader application.

One purpose of our invention to to feed the glue to a glue applying roll in excess of the quantity required and to reduce the quantity by an adjustable doctor roll running in the opposite direction of the glue applying roll.

A further purpose is to feed the glue from a glue dipping roll to a glue applying roll having grooves in its surface by an intermediate roll having ribs overlapping the edges of the grooves.

A further purpose is to provide a glue pot with glue applying roll and glue feed accessories which can be swung out of the way to expose the rest of the mechanism and in which preferably the driving connection cannot be maintained while the glue pot is out of its position.

A further purpose is to operate a gluing machine continuously and its feeding mechanism intermittently by tripping the connection between the continuously rotatable part and the feeding mechanism.

Further purposes will appear in the specification and in the claims.

We have preferred to illustrate but one main form of our gluing machine, selecting a form which has proved to be simple, practical and effective and which at the same time well illustrates the principles of our invention.

Figure 1 is an enlarged side elevation of a gluing machine embodying our invention.

Figure 2 is an end elevation taken from the left hand end of Figure 1, from what is designated as the front of the machine.

Figure 3 is an enlarged side elevation of the gluing machine of Figures 1 and 2 showing the side opposite to that of Figure 1.

Figure 4 is a section looking in the direction of the arrows taken upon line 4—4 of Figure 2 but omitting the glue.

Figures 4ª, 4ᵇ and 4ᶜ (Sheets 8) are fragmentary detail views.

Figure 5 is a section looking in the direction of the arrows upon line 5—5 of Figure 2.

Figure 6 is a section upon line 6—6 in Figure 2 looking in the direction of the arrows.

Figure 7 is a fragmentary section corresponding generally to Figure 4 and upon an enlarged scale.

Figure 8 (Sheet 7) is a side elevation of a groove-cleaning attachment.

Figure 9 (Sheet 7) is an end elevation of the structure seen in Figure 8.

Figure 10 (Sheet 8) is a fragmentary plan view of a part of the glue transfer mechanism.

Figures 11 and 12 (Sheet 8) are end elevations of the transfer roll seen in Figure 10.

Figure 13 (Sheet 9) is an elevation of the glue applying roll seen in Figure 7.

Figures 14 and 15 (Sheet 9) are end elevations of the roll seen in Figure 13.

Figure 16 (Sheet 9) is an elevation of the glue dipping roll seen in Figure 7.

Figures 17 and 18 (Sheet 9) are end elevations of the roll seen in Figure 16.

Figure 19 (Sheet 9) is an elevation of a doctor roll seen in Figure 7.

Figures 20 and 21 (Sheet 9) are end elevations of the roll seen in Figure 19.

Figure 22 (Sheet 9) is an elevation of a modified form of transfer roll from that seen in Figure 10.

Figures 23 and 24 (Sheet 9) are end elevations of the roll seen in Figure 22.

Figure 25 (Sheet 10) is a section of Figures 2 and 26 upon line 25—25 looking in the direction of the arrows.

Figure 26 (Sheet 11) is a section of Figure 25 taken upon line 26—26.

Figure 27 (Sheet 11) is a section of Figure 26 taken upon line 27—27 looking in the direction of the arrows.

In the drawings similar numerals indicate like parts.

Our invention comprises a complete gluing mechanism with the necessary parts for feeding and gluing sheets of paper for the purpose, for example, of forming the covering material for paste-board boxes and in that connection is adapted to cooperate with a box wrapping machine.

The mechanism of our gluing machine has been divided by us for convenience, merely of description and reference into A, frame; B, feed table and counterweighting; C, feeding mechanism; D, air pressure and exhaust; E, gluing mechanism; F, general driving mechanism; G, the apron conveyor; and H, synchronizing mechanism. In making this division into groups it is recognized that there are no exact and sharp division lines in the mechanism corresponding with the groups indicated and there is likely to be overlapping of the parts.

Frame—Group A

Figure 1:
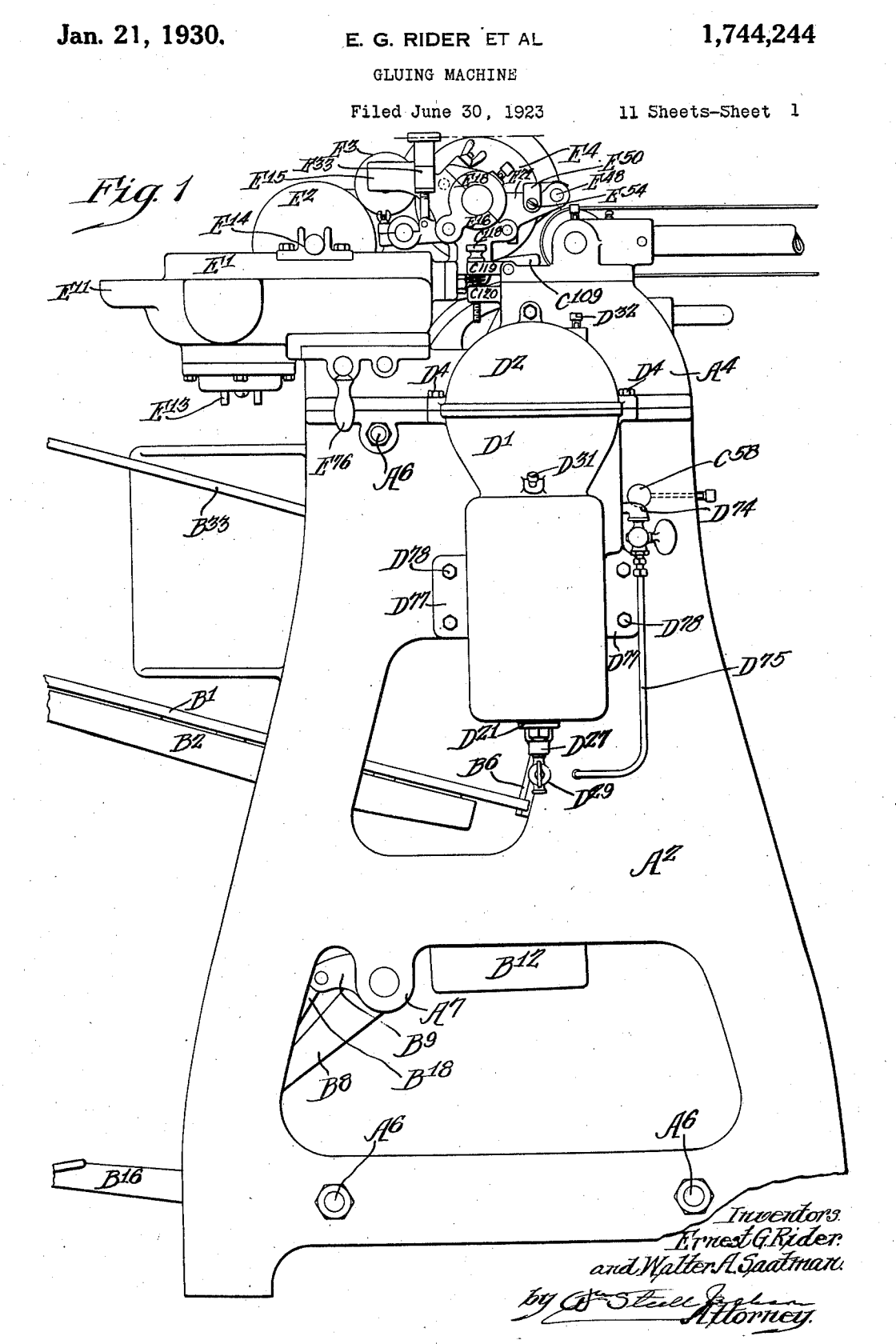

The main frame (Group A) best seen in Figures 1–5, comprises left and right side frame members $A^1$ and $A^2$, left and right upper frame members $A^3$ and $A^4$, stiffening cross brace $A^5$, bolted to the side and a plurality, here shown as three, tie rods $A^6$ whose construction in so far as it is specially suited to the support of or for cooperation with other structure will be pointed out where the other structure appears.

Feed table and counterweighting—Group B

This group is best seen in Figures 2 and 4. The feed table $B^1$ is supported upon a feed table frame $B^2$ having a long bearing $B^3$, in guides $B^4$. The table slopes downwardly to a wall $B^5$ ribbed at $B^6$. The wall and ribs cooperate with the feed table and are hence given place in the B group. The guides are perpendicular to the plane of the table.

The table is counterweighted through the train of parts $B^7$ to $B^{12}$. $B^7$ and $B^8$ are pivoted to the table support by pins $B^{13}$ and $B^{14}$. The arm $B^8$ and the rocker arm are rigidly connected to the stem shaft $B^{15}$ which turns in bearings $A^7$. The one arm is a counterweight arm.

The table may be lowered at any time to permit filling with cover sheets through the treadle $B^{16}$, pivoted upon one of the tie rods $A^6$ and connected with the second arm $B^{17}$ of rocker arm $B^{10}$ by a link $B^{18}$ which is pivoted to the treadle and lever arm respectively by pins $B^{19}$ and $B^{20}$.

The guides $B^4$ are protected against dripping of glue by means of guide guards $B^{25}$. (See Figure 5, Sheet 5.)

We provide a spring stop for wraps at $B^{26}$ (Figure 2, Sheet 2) comprising pivoted fingers $B^{27}$ pivoted at $B^{28}$ and carrying pins $B^{29}$ adapted to rest upon the top of the paper and to be drawn downwardly and toward each other by a spring $B^{30}$ fastened at its ends on screws $B^{31}$. The pins prevent movement of the wraps in a direction rearwardly of the pile.

The pivots are supported in a holder $B^{32}$ that is adjustably held to a guide bar $B^{33}$ by a clamp $B^{34}$.

The bar $B^{33}$ is hung over one of the tie rods $A^6$ by a bracket $B^{35}$ fixed.

We may use the same bar $B^{33}$ for the support of an additional pressure device which may be a spring holder $B^{36}$ (Figure 4) held in adjusted position by set screw $B^{37}$, and carrying a spring finger $B^{38}$, pivoted at $B^{39}$ and pressed downwardly by a spring $B^{40}$. The lower face $B^{41}$ of the finger is adapted to press upon the upper surface of the top sheet. And its upper end presents an abutment $B^{42}$ for engagement by a suction roll feeder $C^1$ which lifts this pressure device as the parts come in position for sliding withdrawal of the top wrap at a time when the suction roll presents a cooperating flattened under surface. This finger is shown in raised position in Figure 4, Sheet 4.

Feeding mechanism—Group C

*Mechanical feeding structure.*—The mechanical feeding structure clusters about the suction roll $C^1$ which is mounted in a carrier $C^2$ travelling upon guides having the inclination of the table $B^1$ and, consequently, of the pile of wraps $B^{43}$ which are being handled, and having a hollow bearing $C^4$.

Within the roll is mounted an air tube which connects to a suction pipe $C^9$.

A blast roll $C^{48}$ flattened on one side as at $C^{52}$ to permit clearance when passing over the top of a cross tie, shown in Fig. 4, functions to separate the edges of successive wraps and has bearings at both ends in the carriage sides. The bearing at one end of the blast roll is bifurcated to provide for the link $C^{54}$, which is pivoted at $C^{56}$ between the forks of an arm $C^{57}$ rigid upon the shaft $C^{58}$ and rigid with a segmental gear $C^{59}$.

The segmental gear $C^{59}$ is operated by a segmental gear $C^{60}$ upon one end of a lever $C^{61}$ which is pivoted upon a pin $C^{62}$ resting in the frame and whose opposite end carries a laterally projecting roller $C^{63}$ lying within a face cam $C^{64}$ within a buffer member belonging in the F group. This construction is best seen in Figure 4, Sheet 4, and Figure 25, Sheet 10.

By this construction the arm $C^{57}$ is timed with respect to the rotations of the feed cylinder and through the link $C^{54}$ reciprocates the carriage $C^2$ in definite relation to the rotations of the feed cylinder.

The suction roll and blast roll $C^1$ and $C^{48}$ carry gears $C^{66}$ and $C^{67}$ keyed to the rolls at one end only, as shown, or at both ends as preferred and meshing with a rack or racks $C^{68}$.

The feed cylinder $C^{42}$ carries gripper fingers $C^{71}$ pivoted at $C^{72}$ and spring pressed upon the surface of the cylinder by a spring $C^{73}$, surrounding a rod $C^{74}$, pivoted to arm $C^{75}$ at $C^{76}$ so as to maintain the gripper fingers normally in closed position. The inner end of the rod $C^{74}$ is guided within a hub $C^{77}$ or other part rotatable with the feed cylinder and against which the inner end of spring $C^{73}$ engages. However, the arm $C^{78}$ rigid with the gripper fingers and arm $C^{75}$ carries a roller $C^{79}$ which is engaged by the surface $C^{80}$ of a non-rotatable cam $C^{81}$ adjustable angularly by means of slots $C^{82}$ and cap screws $C^{83}$. By this means the grippers are adapted to open and close in timing with the rotation of the feed cylinder so as to engage the wrap just as it is fed in position by the suction roll and to release the wrap just before it comes into engagement with the glue applying roll.

As the wraps are carried upwardly by the feed cylinder they pass under roller or rollers $C^{85}$ pivoted at the outer ends of spring arm or arms $C^{86}$ which are mounted by means of hub $C^{87}$ upon pin or shaft $C^{88}$ mounted in the frame. The spring of the arm $C^{86}$ is secured by forming the arm in two parts pivoted together at $C^{89}$ and spring pressing the arms apart by spiral spring $C^{90}$ seated at its ends against or within apertures in the two parts.

The rollers or rollers $C^{85}$ press the wrap firmly against the feed cylinder surface so that the wrap will be fed by said surface independently of the gripper fingers which are released in a position between that of the rollers $C^{85}$ and stripper fingers $C^{91}$ which fit into grooves $C^{92}$ within the surface of the feed cylinder.

As the wraps are stripped from the feed cylinder undue movement away from the cylinder is prevented by a guard plate $C^{93}$ terminating in a shield $C^{94}$ intended to prevent accidental flow of glue from the plate $C^{93}$ and to divert any such glue flow past the ends of the feed cylinder. As the wrap passes between the stripper fingers and the plate $C^{93}$ it engages the surface of and is glued by the glue applying roll which belongs in the E group and will be there described.

Rearward limit of movement of the carriage is set and may be very exactly adjusted by set screws engaged by the carriage. It is locked in bracket $C^{105}$ by a nut. The bracket is held in place by a bolt.

A guard $C^{106}$ (Figure 6) protects the gearing from glue.

The air pump is operated from the main shaft $C^{108}$ of the feed cylinder and is mounted upon the frame of the machine and comprises a two-part casing $D^1$, $D^2$ held together by flanges and suitable bolts $D^4$.

The cylinder of the pump is surrounded by a compression chamber $D^{21}$ which receives air under pressure from the cylinder during the compression part of the stroke through a pressure (check) valve in the end of the cylinder.

The outlet valve between the cylinder and the chamber $D^{21}$ operates through a trap valve $D^{27}$. When the suction roll is not being operated inlet is provided through the same trap valve $D^{27}$. There is also a suitable atmospheric connection controlled by a valve $D^{29}$.

Suitable oilers $D^{31}$, $D^{32}$ are provided.

An elbow $D^{74}$ (Figure 1) in direct communication with the pipe $D^{75}$, feeds a fixed discharge nozzle $D^{76}$ (Figure 5) by which air blast is directed upon the edge of the pile of wraps at the top during the rolling up of a top wrap by the suction roll and preparatory to the lifting of another wrap when the suction roll shall have returned to the end of the pile.

The discharge outlet communicates with an elbow $D^{73}$ connected with pipe $D^{107}$ and elbow $D^{108}$ upon the end of the bodily movable and rotatable blast pipe.

The entire pump mechanism is suitably supported from the frame by any brackets $D^{77}$ and bolts $D^{78}$.

*Feeding operation*

In operation as thus far described the wraps are piled upon the feed table and with the table full the counterweight is adjusted upon its supporting rod to the proper distance so as to maintain the desired pressure upon the top of the pile. The adjustment will differ with different density of the paper and different sizes (lengths and widths of wrap). With successive operations of the machine the pump supplies suction to the suction roll during half of the piston stroke, though it is rendered effective through the suction roll during such time only as the openings in the pipe and roll register. This registration begins near the extremity of the movement of the suction roll to the right from the position in Figure 4. The air blast through the blast roll and fixed blast nozzle respectively is timed to take place when the parts are at end of back stroke approximately in the positions shown in Figure 4 as determined by the operation of the cam upon the main shaft.

Starting with the parts in the position shown in Figure 4, the suction is available at the suction roll and the front end of the top wrap (at the rear of the machine) is pressed against the suction roll by the pressure of the outside air but at a point slightly to the left of the extreme end of the wrap. The presser foot $B^{38}$ if used in pushing down on the top of the pile and the rear of the top of the pile is engaged by pins $B^{29}$.

As the arm $C^{57}$ swings to the left (Figures 4 and 5) the carriage moves to the left and the suction roll and blast roll are rotated by their gears engaging the rack at the same time that the rolls are moved bodily along with the carriage.

With the first rotation of the suction roll the end of the wrap pressed against it because of the suction is lifted by it and continued lifting movement causes the end of the wrap to pass between the suction roll and fender roller or rollers increasing the friction of the wrap against the suction roll and causing the wrap to be fed through between the suction roll and fender roller or rollers largely independently of the suction roll upon the wrap except that this suction is utilized to hold the wrap against the roll and guide it out into position to be engaged by the grippers upon the feed cylinder.

With the first lifting movement of the front end of the wrap the wrap engages with a suitable separator, with the result that if more than one wrap has been lifted, these edges are separated and the extra wrap or wraps fall back in position.

*Gluing mechanism—Group E*

This mechanism is best seen in Figures 1, 2, 4, 6 and 7, the most of the description being clear from Figures 6 and 7.

The gluing mechanism comprises generally a glue pot $E^1$, a glue dipping roll $E^2$, an intermediate transfer roll $E^3$, a glue applying roll $E^4$ and a squeeze or doctor roll $E^5$ with the several accessory parts.

The entire gluing mechanism including the parts already described is mounted upon a frame $E^6$, which swings laterally by reason of vertical bearing $E^7$ upon a post $E^8$ resting in a socket $E^9$ in the frame of the machine. The post is held in place by a set screw $E^{10}$. At the front of the machine there is an overflow receptacle $E^{11}$. Beneath the glue pot is a space $E^{12}$ for a glue heating liquid whose temperature is maintained by any suitable electric heater $E^{13}$, or other heating means.

The bearings $E^{14}$ for the glue dipping roll are carried directly by the glue pot while the bearings $E^{15}$, $E^{16}$ are carried by a side frame structure $E^{17}$, supported upon the rear of the glue pot and providing for the support of the other rolls and for mounting intermediate gearing by means of studs.

The bearing $E^{15}$ is open at the top and acts as a guide rather than strictly as a bearing since the transfer roll mounted in it rests against the glue dipping roll and glue applying roll to receive glue from one and to transfer it to the other.

The bearing $E^{16}$ is provided with a cap $E^{18}$, hinged at $E^{19}$ and held in place by a thumb nut and bolt, $E^{20}$ and $E^{21}$, respectively. The cap carries an extension arm $E^{22}$, terminating in a boss $E^{23}$ hereinafter described.

About pins $E^{24}$ conveniently used on one side to support gearing are pivoted arms $E^{25}$, carrying the lower halves of bearings $E^{26}$ having caps $E^{27}$, hinged at $E^{28}$ and held in closed postion by thumb nuts and bolts $E^{29}$ and $E^{30}$ respectively. The hinge pins for the caps afford convenient connecting points for adjusting rods $E^{31}$, by means of nuts $E^{32}$ resting upon the poppets $E^{33}$, swing the bearings for the doctor roll about the centers of the arms. As these arm centers are outside of the axis of the glue applying roll the distance of the doctor roll from the glue applying roll is thus made adjustable. Its adjustment with respect to the surface of the glue-applying roll controls the quantity of glue permitted to remain upon the glue-applying roll as it passes the doctor roll.

As will be noted subsequently from the description of the gearing, the doctor roll rotates in a direction opposite to the direction of rotation of the glue-applying roll so that the doctor roll picks up and carries away from the glue-applying roll all of the surplus glue under the adjustment selected for the doctor roll.

Where the doctor roll rotates in the same direction as a glue-applying roll the sticky film of glue divides irregularly between them where they separate, leaving the glue upon the glue-applying roll streaked and seamed by reason of the pulling of the glue. Dirt and other foreign matter in the glue is also carried through freely and part of it at least is left upon the glue-applying roll. As distinguished from this, rotation of the doctor roll in the opposite direction leaves the glue film upon the glue-applying roll smooth and even and pushes dirt and other foreign matter back from the glue-applying roll, carrying it upon the surface of the doctor roll to a point where it can be automatically removed.

The extra glue upon the doctor roll is scraped from it at any convenient part of its circumference so as to fall back into the glue body by scraper $E^{34}$.

The scraper is shown as of circular cross section at $E^{35}$ in Figure 6 where it is mounted upon a pin $E^{36}$ in an arm $E^{37}$ integral with the bearing $E^{26}$. This construction is duplicated at two ends so as to pivot the scraper.

At its intermediate section the scraper comprises a bar $E^{38}$ fitted to hold a scraper blade $E^{39}$ which is fastened to it by a clamp $E^{40}$ and screws $E^{41}$. At the end of the glue pot a screw $E^{42}$ bears againset the lower edge of the bar to apply pressure to this edge to rock the scraper bar and to increase the pressure of the scraper blade against the doctor roll. The doctor roll and scraper both drain into the glue pot. This construction is best seen in Figure 7.

Drainage of the glue pot is provided by a plug stopper $E^{44}$.

The glue-applying roll $E^4$ is grooved at intervals at $E^{46}$ in order to permit picker fingers $E^{47}$ to fit within the grooves and get under the edges of the wraps as they pass about the surface of the glue-applying roll to which they are fed by the main feed cylinder.

It might be noted here that the guiding mechanism between the feed cylinder and the glue-applying roll which supports the stripper fingers $C^{91}$ comprises a stripper bar $C^{109}$ pivoted at its ends $C^{110}$ in the frame of the machine $A^3$ and carrying a glue drip receiver $C^{111}$ for the glue which falls from the back of the glue-applying roll and a guide bar C$^{112}$ upon which the stripper fingers C$^{91}$ are supported. The guide bar is mounted on pins C$^{115}$ adjustable in suitable openings in the bar C$^{109}$.

The picker fingers E$^{47}$ are supported upon a rod E$^{48}$ fastened within the arm E$^{22}$. The pickers are maintained in line upon the rod by means of set screws E$^{49}$. The rod is rigid when in operating position and is held in place by a clamp E$^{50}$. It may be moved longitudinally and will then come out bodily without disengaging the pickers, upon loosening a suitable screw E$^{54}$.

A straight transfer roll E$^3$ would tend to fill the grooves of the glue-applying roll with glue.

To avoid this the glue transfer roll E$^3$ (Sheet 10) is slightly reduced in diameter throughout belts E$^{55}$ so as to provide intervening ribs E$^{56}$ spaced to correspond with and overlap the edges of the grooves in the glue-applying roll.

The additional pressure of the ribs E$^{56}$ against the surface of the glue dipping roll causes these ribs to emerge from contact with the glue dipping roll with a comparatively slight film of glue upon them, while the reduced or relieved intervening portions E$^{55}$ receive a depth of glue from the glue dipping roll proportionate to the predetermined depth of the reduced portions and deposit this predetermined depth of glue in relatively wide strips upon the engaged surface of the glue-applying roll (between the edges of the grooves in the glue-applying roll).

The ribs E$^{56}$ having but a slight initial film of glue upon them bear firmly against and over the edges of the grooves in the glue-applying roll, with the result that but a very slight film of glue is applied to the surface of the glue-applying roll along the edges of the grooves and no glue enters the grooves. The doctor roll E$^5$, (Sheet 7) rotating in an opposite direction from that of the glue-applying roll removes any predetermined proportion of the depth of glue applied to the glue-applying roll between the edges of the grooves and does not spread this glue into or over the edges of the grooves. As a result the wraps show a line of relatively dry paper slightly wider than and otherwise corresponding in position with the grooves of the glue-applying roll.

In Figure 22, Sheet 9, we have shown a modified form of glue transfer roll in which the roll is cylindrical transferring an equal film of glue throughout its length and for this reason necessarily crowding some glue into the picker grooves of the glue-applying roll. This modified form of glue transfer roll is mounted in precisely the same manner as the form shown in Figure 7, (Sheet 7).

In order to relieve the picker grooves of the glue which they receive from this glue transfer roll we provide cleaners E$^{57}$ (Sheet 7) of nearly triangular form mounted edgewise to fit into the picker grooves. These cleaners are mounted upon rods E$^{58}$ which may rest in bearings within or mounted upon the sides of the glue pot and movable with it. They may also float between the rolls.

The top edge E$^{59}$ is effective to clean out the grooves spreading the glue upon the adjoining surface of the glue-applying roll where it is picked up as any other surplus glue would be from the glue-applying roll by the surface of the doctor roll which is indicated as an opposite direction of movement to the adjoining surface of the glue-applying roll.

The bearings or supports for the cleaner rod are desirable to hold the cleaners in raised position above the doctor roll and to resiliently press the cleaning edges within the grooves, but may be wholly omitted without affecting their cleaning functions since the weight of the rod tends to hold the triangular cleaners down against the glue-applying roll and doctor roll respectively and the friction upon the two rolls tends to keep it there. It will be noted that the engagement of the glue-applying roll with the edges E$^{60}$ of the cleaners and the sides of these cleaners adjacent the edges will tend to pull the cleaners down into the space between the glue-applying roll and doctor roll while the friction of the doctor roll against the edge E$^{61}$ of the cleaners will tend to lift the cleaners out of the space. The combination of these forces has been found to effectively hold the cleaners in operative position.

*The gearing for the glue rolls.*—Because of the fact that the glue pot and appurtenances, including the various glue rolls, can be swung away from the machine as a unit, it is necessary to provide them with separate and distinct driving mechanism which is interconnected when in the closed position with the main driving mechanism of the machine. For the same reason I depart from the usual order and describe this gearing in more immediate conjunction with the mechanism which it drives.

The main driving mechanism rotates a shaft hereinafter described, which terminates in a clutch member (all belonging in the F group) and which shaft is splined to slide into and out of driving connection with a clutch E$^{62}$ (Figure 26) upon the reduced end E$^{63}$ of the same shaft E$^{64}$ upon which the glue-applying roll is mounted so as to drive the glue-applying roll directly through this clutch. Between the reduced end E$^{63}$ and the main part of the shaft is a reduced section E$^{65}$ forming a shoulder engaging the bearing and preventing endwise tendency to movement of this shaft.

The bearing about the reduced portion E$^{63}$ of this shaft is bored throughout as at E$^{66}$ to the diameter of the portion $E^{64}$ of the shaft and is counterbored as at $E^{67}$ to provide room for a gear $E^{68}$ whose teeth lie within the counterbore and whose hub projecting into the bore is pinned to the end $E^{63}$ of the shaft by a pin $E^{69}$.

The gear $E^{68}$ forms the driving gear for the doctor roll, glue dipping roll and transfer roll and at the same time extends over the F group member of the clutch sufficiently to assist in maintaining the clutch members in line when in actual engagement.

The gear $E^{68}$ meshes with a idler gear $E^{69}$ (Sheet 6) mounted upon one of the pins $E^{24}$ which idler meshes in turn with a gear $E^{70}$ upon the shaft of the doctor roll turning the doctor roll in the same direction of angular rotation as the glue-applying roll which results in the adjacent surfaces of these rolls rotating in opposite directions, that of the doctor roll moving upwardly while that of the glue-applying roll moves downwardly.

The gear $E^{70}$ engages and drives a gear $E^{71}$ upon the shaft of the transfer roll with which engagement the slight adjustment of the doctor roll does not interfere.

It will be seen that the adjoining surfaces of the glue-applying roll and transfer roll move in the same direction.

Upon the same shaft as the gear $E^{70}$ and connected to operate at the same angular speed in a gear $E^{72}$ which meshes with an idler $E^{73}$ mounted upon pin $E^{74}$ in the glue pot frame. This idler $E^{73}$ meshes with the drives a gear $E^{75}$ upon the shaft of the glue dipping roll rotating it in the same angular direction as the glue-applying roll by reason of which its surface adjacent the surface of the glue transfer roll moves in the same direction as the latter surface.

*Operation of gluing mechanism.*—The glue dipping roll is higher at its edges than at the center and consequently with a straight roll between would deposit a corresponding depth of glue upon the glue transfer roll for transfer to the glue-applying roll. The doctor roll picks up and removes any surplus of glue for the particular adjustment desired which may have been deposited upon the glue-applying roll and the scraper progressively cleans the surface of the doctor roll so that a clean surface is available all the time to receive and remove extra glue from the glue-applying roll.

Where the plane roll is used the cleaners are provided for removing the glue from the glue-applying roll which would otherwise be carried about the roll to the pickers with danger meantime of deposit upon the wrap being glued. However, we prefer to use the form of transfer roll having ribs or rings about its circumference corresponding in position to the grooves for the purpose of reducing the deposit of glue upon the surface of these rings to a minimum so as not to crowd glue into the grooves of the glue-applying roll.

The wrap engages the glue-applying roll first along its medial line, the width of contact spreading progressively toward the edges until the entire width of the wrap is in contact with the glued surface of the roll. With respect to the feeding guides the pickers are placed beyond the position of tangency so as to make the spring of the paper helpful in ensuring full width of contact between the wrap and glue-applying roll.

The entire gluing mechanism is shifted by means of the handle $E^{76}$ (Sheet 1). The driving clutch ($E^{62}$ and $E^{63}$) is separated prior to swinging the glue pot and associated mechanism.

When the gluing mechanism has been swung to the left in Figure 5 the feeding mechanism is rendered much more accessible.

As swinging movement of the gluing mechanism automatically disconnects it from its driving shaft safety of access to it is ensured.

*General driving mechanism—Group F.*

In the general driving mechanism, best seen in Figure 26, Sheet 11, we refer also to Figure 2, Sheet 2, Figure 3, Sheet 3.

Upon the bracket $F^1$ we mount a motor $F^2$ coupled at $F^3$ to a worm $F^4$ mounted in bearings $F^5$ within gear casing $F^6$ upon the left side of the gluing machine as viewed from the front.

The shaft $C^{108}$ is extended through the gear casing and is reduced in diameter at $F^7$ and also at $F^8$. Upon the reduced portion $F^8$ of shaft $C^{108}$ is mounted a sleeve $F^9$ rotatable with the shaft and supporting a worm gear $F^{10}$ meshing with the worm and continuously driven by it during the operation of the motor. The gear has bearing upon the outside of the sleeve when the shaft $C^{108}$ is not in operation and travels with it at the time speed when the shaft $C^{108}$ is driven.

The worm gear $F^{10}$ is extended to the right in Figure 26 to form an integral gear $F^{11}$ which also rotates continuously with the motor. The worm gear and gear $F^{11}$, considered as a unit, are hollow and give place within them for a movable clutch member $F^{12}$ having inset wooden clutch bearing faces $F^{13}$ terminating at an angle, and for a follower disc $F^{14}$. The movable clutch member fits within a cooperating clutch surface $F^{15}$ and is supported for longitudinal clutch engaging movement along the reduced portion $F^7$ of shaft $C^{108}$ by a hub sleeve $F^{16}$ which has longitudinal movement along but no rotation on the shaft.

The follower disc $F^{14}$ fits within a recess $F^{17}$ upon the inside of the gear $F^{11}$. On one face it is recessed at $F^{18}$ at intervals to provide seats for spiral springs $F^{19}$ by which it presses the movable clutch member toward clutch engaging position which therefore is the normal position of this movable clutch member except as disengaged by other means. A stud $F^{20}$ in the follower disc passes through an opening $F^{21}$ in the clutch member and drives the clutch member. It is free to slide in this opening to accommodate differences in spacing between them. On the opposite side the disc $F^{14}$ is grooved to form the internal cam $C^{64}$.

The disc is hubbed at $F^{22}$ to give additional support upon the shaft and is keyed to the shaft at $F^{23}$. The same key is used to fasten to the shaft a gear $F^{24}$ which rotates with the shaft.

Upon the shaft $C^{108}$ to the right of the gear $F^{24}$ in Figure 26, Sheet 11, is mounted a hub $F^{25}$ upon which is carried the gripper cam $C^{81}$.

In order to provide for continuous rotation of the gluing mechanism the teeth of gear $F^{11}$ engage the teeth of the gear $F^{26}$ splined at $F^{27}$ to a shaft $F^{28}$ rotatable and also movable longitudinally in bearings $F^{29}$, $F^{30}$ in the gear case and frame respectively. The shaft $F^{28}$ carries an enlarged end $F^{31}$ upon which is mounted a clutch member $F^{32}$ adapted to engage the clutch member $E^{63}$.

The end of the shaft $F^{28}$ is grooved at $F^{33}$ for engagement by a fork or projection $F^{34}$ upon a hand lever arm $F^{35}$ pivoted at $F^{36}$ in a projection $F^{37}$ from the gear casing. The shaft may thus be slid back out of clutch engagement with the clutch member $E^{63}$ and is held in its several positions by a latch $F^{37}$ fitting into openings $F^{38}$ in the shaft and spring pressed into engagement with the shaft by a spring $F^{39}$ secured to the gear hub $F^{40}$ by screws $F^{41}$.

When the gluing mechanism is intended to be disconnected whether preparatory to swinging it out of its position or not the hand lever $F^{35}$ is thrown to the left to Figure 26 to release the clutch.

As will be seen the feed cylinder and the gluing mechanism have continuous operation during the time the clutch member $F^{12}$ is in engagement with the clutch surface $F^{14}$. The feed cylinder is stopped at the end of each rotation and is held until released by tripping mechanism provided. On the other hand the apron is intended to be actuated during a part only of the time of rotation of the feed cylinder and though it must start at the same position of feed cylinder travel we have provided adjustment of the extent of feed to correspond with differences in the lengths of the wraps as hereinafter described.

*The drive for the apron conveyor.*—With clutch engagement the gear $F^{24}$ is driven continuously. This gear is one of a pair of Geneva stop-motion gears whose mating Geneva gear $F^{42}$ is carried by a stud secured in the frame of the machine by nut $F^{44}$ bearing against washer $F^{45}$. This stud carries also a gear $F^{46}$ which is rigid with and preferably integral with Geneva gear $F^{42}$.

Of the two Geneva gears $F^{24}$ and $F^{42}$, $F^{24}$ is the driving gear. It is also the larger gear and, though each carries the same number of teeth, the teeth occupy a smaller part of the circumference of gear $F^{24}$ than of gear $F^{42}$ to permit the lost motion between the two gears to take place in the second Geneva gear $F^{42}$ rather than within the first which must travel with the shaft.

For the purpose of smoothing the beginning of the driving and driven engagement of the Geneva gears we provide a quickening contact between the pin $F^{51}$ carried by the rear of the disc $F^{14}$ and the walls $F^{52}$ of slot in projection $F^{53}$ from the otherwise free face of gear $F^{46}$. The projection is held against rotation upon the gear by screw $F^{54}$.

Each rotation of the driven Geneva gear $F^{42}$, causes a rotation of the gear $F^{46}$ (Figure 26, Sheet 11) rigid with it and causes considerably more rotation of a gear $F^{55}$ meshing with gear $F^{46}$, since gear $F^{46}$ is much larger than gear $F^{42}$. Gear $F^{55}$ is rigid with a face clutch $F^{56}$. Both the gear and face clutch rotate freely upon a shaft $F^{58}$ which is keyed to a sleeve terminating in a face clutch $F^{62}$ co-acting with the face clutch.

It will be noted that the gear $F^{55}$ rotates during a part only of the rotation of the feed cylinder, dwelling for the remainder of the rotation of this cylinder, and that the face clutch $F^{62}$ is driven for a part only of the time of rotation of the gear $F^{55}$.

The face clutch $F^{56}$ and its integral gear $F^{55}$ are shifted by means of engagement between the member $F^{70}$ and the head $F^{68}$ of a suitable outwardly pressing shift pin. The member $F^{70}$ comprises one end $F^{70}$ of a rocking arm $F^{71}$ pivoted upon a pin $F^{72}$ rigid with the frame for the purpose of disconnecting the two clutch faces $F^{56}$ and $F^{62}$. The pin $F^{72}$ is held in position by set screw $F^{73}$.

The lower end $F^{74}$ of this rocking lever $F^{71}$ engages a pin, supported in sleeve $F^{76}$ which is carried by a sliding rod $F^{77}$ operated by suitable handle. The rod $F^{77}$ slides in a guide formed between the boss $F^{82}$ in the frame and a plate $F^{83}$ secured to the frame. Its position determines the point of cycle at which the clutch faces 56 and 62 separate by proper operation with the different steps of a stepped face cam $F^{85}$, and thereby determines the length of movement of the apron conveyor before disconnection of its driving clucth $F^{56}$.

*Main clutch tripping mechanism.*—The disconnection of the clutch faces $F^{13}$ from the cooperating clutch surface $F^{14}$, the main clutch mechanism of the machine, may be accomplished in two ways, the one tripping to stop the feeding mechanism after each complete rotation of the feed cylinder and the other to stop the feeding mechanism independently of movement of the tripping lever.

The hub $F^{16}$ is grooved to provide a seat for a radially projecting rib $F^{96}$ upon a pin $F^{97}$ passing through the sleeve $F^9$ and hence rotating with the worm gear $F^{10}$. This pin $F^{97}$ is normally spring pressed toward the left in Figure 26, Sheet 11 by reason of the spring pressure against the movable clutch member $F^{12}$, but if moved to the right carries the movable clutch member longitudinally of the shaft $C^{108}$ and against the pressure of the springs $F^{19}$.

Within the path of revolution of the rod $F^{97}$ is located a cam $F^{98}$ rigid with a bearing pin $F^{99}$ which turns within the gear casing at $F^{100}$. The construction is best seen in Figures 26 and 27, Sheet 11.

The cam carries a cam face $F^{101}$ which is swung by turning of the pin $F^{99}$ into or out of the path of movement of rod $F^{97}$ but is normally pressed into the path of movement of this rod $F^{97}$ by a nose $F^{102}$ spring pressed at $F^{103}$.

Upon the outer end of pin $F^{99}$ an operating lever $F^{104}$ is located by which the cam face $F^{101}$ is swung out of tripping position, the spring pressed nose returning it to tripping position so as to throw the clutch. This releases the rod $F^{97}$ from the cam, permitting main clutch engagement and resulting in corresponding complete rotation of the movable clutch member $F^{12}$ and hence of shaft $C^{108}$ until the rod $F^{97}$ comes around again to clutch disengaging position where its engagement with the cam face $F^{101}$ releases the clutch. Each tripping movement of lever $F^{104}$ therefore permits one complete rotation of the feed cylinder with corresponding movement of the connected parts relating to the wrap feeding mechanism and including the feed apron. The extent of movement of the feeding mechanism is the same but the extent of movement of the apron varies according to the setting of the pin $F^{75}$.

When it is desired to shut off the machine so that its feeding mechanism will not respond to movement of the tripping lever this is accomplished by turning a screw $F^{105}$ as by hand wheel $F^{106}$ so as to cause its end to bear upon rod $F^{107}$ passing through the center to shaft $C^{108}$. This rod engages a transverse bar $F^{108}$ which terminates at opposite ends in sleeve $F^{16}$ and passes through an elongated opening $F^{109}$ in the shaft. Pressure upon the bar by reason of the screw releases the main clutch and holds it released against the pressure of springs $F^{19}$ without regard to the position of the tripping lever.

If the tripping lever $F^{104}$ be held in turned position the feeding mechanism will operate continuously. The gluing rolls are independently controlled by lever $F^{35}$ and in addition for their movement depend upon maintaining the gluing mechanism in closed position to engage clutch members $E^{62}$ and $E^{63}$. During each rotation of the feed cylinder the Geneva gear $F^{24}$ causes movement during part of the time Geneva gear $F^{42}$ with corresponding partial rotation of the step cam $F^{85}$ and of the gears $F^{46}$ and $F^{55}$. The step cam controls the movable clutch member $F^{56}$ to permit engagement of this clutch for a part of the time of rotation of gear $F^{55}$.

Suitable oil cups are provided for the mechanism such as are shown at $F^{110}$ and drainage for the gear case takes place by removal of plug $F^{111}$.

In view of our disclosure herein variations and changes of the form of our invention will doubtless occur to those skilled in the art depending for the character of the change upon the needs and whim of the individual designer as well as upon his views as to changes requisite in evasion of the claims; and it is our purpose of course to secure herein all such variations and changes as fall within the reasonable spirit and scope of our invention.

Having thus described our invention what we claim as new and desire to secure by Letters Patent is:—

1. In a gluing machine, a grooved feed cylinder, means for feeding the paper to the feeding cylinder, grippers engaging the paper, a glue pot, a glue roll therein, a grooved glue-applying roll adjacent to the feeding cylinder, a transfer roll receiving the glue from the glue roll and applying it to the glue-applying roll, a doctor roll adjustable toward and from the glue-applying roll to limit the quantity of glue on the latter and wipers between the transfer roll and the doctor roll entering the grooves of the glue-applying roll and wiping the glue from the grooves.

2. In a gluing machine, a glue-applying roll, a glue pot, means for supplying glue to the applying roll from the glue pot and a doctor roll located beyond the point of glue supply in the direction of rotation of the applying roll, between it and the object to be glued, and rotatable so that where the surfaces of the two rolls are contiguous the surfaces move in opposite directions.

3. In a gluing machine, a glue pot, a glue-applying roll, a dipping roll and connections feeding glue to the applying roll from the dipping roll and a doctor roll for operating upon the glue-applying roll and located further around the circumference of the applying roll than the point of glue supply to it, between that point and the object to be glued, adjustable with respect to the applying roll and having its periphery adjacent the latter moving in the opposite direction from that of the applying roll.

4. In a gluing machine, a glue pot, a dipping roll therein, a glue-applying roll, a transfer roll on which glue picked up by the dipping roll is deposited, corresponding in direction of peripheral movement with that of the glue-applying roll where the glue is applied, a doctor roll adapted to remove excess glue from the glue-applying roll, located along the surface of the latter beyond the transfer roll and rotated so that its surface moves in the opposite direction from the adjoining surface of the applying roll and a doctor engaging the doctor roll to remove glue from the doctor roll and return it to the glue pot.

5. In a gluing machine, a glue pot, a dipping roll therein, a grooved applying roll receiving the glue dipped from the glue pot, connections therebetween, pickers for the grooves of the applying roll, a doctor roll rotated so that its surface moves in the direction opposite to the adjoining surface of the applying roll and removing excess glue from the applying roll and wipers entering the grooves of the applying roll.

6. In a gluing machine, a glue pot, a dipping roll therein, a transfer roll receiving the glue dipped from the dipping roll, and having circumferential ribs at intervals, an applying roll grooved at intervals corresponding with the circumferential ribs and the grooves of which are covered by said ribs at the point of contact, whereby the glue is deposited on the applying roll between the grooves, and pickers for the grooves of the applying roll.

7. In a gluing machine, a glue-applying roll having circumferential grooves at intervals along its length, pickers fitting within the grooves, means for feeding sheets of paper one at a time to the roll, a transfer roll having circumferential ribs in position to cover the grooves of the applying-roll at the point of engagement between the rolls and glue feeding roll mechanism engaged by the transfer roll whereby glue is picked up by the transfer roll between the ribs and is transferred to the applying roll.

8. In a gluing machine, a glue dipping roll, a glue applying roll having picker grooves in its surface and an intermediate roll bearing against both of the rolls along narrow ribs to squeeze out glue from the surface of these ribs where it engages the dipping roll and to cover the picker grooves by the ribs thus freed of glue and relieved between the ribs to a depth corresponding to the depth of glue coating intended to be taken up from the dipping roll.

9. In a gluing machine, a feed cylinder bodily fixed in position and adapted to feed wraps one at a time, in combination with a gluing device comprising a glue roll and means for applying the glue to the surface of the glue roll and a vertical pivot about which the gluing device swings to throw it into and out of cooperative position with respect to the feed cylinder.

10. In a gluing machine, a feed cylinder bodily fixed in position and adapted to feed wraps one at a time, in combination with a gluing device comprising a glue roll and means for applying the glue to the surface of the glue roll, a vertical pivot about which the gluing device swings to throw it into and out of cooperative position with respect to the feed cylinder and driving connections for the glue roll out of connection when the gluing device has been swung about said pivot.

11. In gluing machine, a glue-applying roll, a roll from which it receives its glue, adjoining peripheries of the two rolls moving in the same direction and a doctor roll for operating upon the surface of the glue-applying roll, located beyond the second roll named in the direction of movement of the surface of the glue-applying roll and having its adjoining surface moving in the opposite direction from the direction of movement of the adjoining surface of the glue-applying roll to reduce and spread the film of glue thereon.

12. In gluing machine, a glue-applying roll, a roll having ribs and intermediate reduced portions of depth corresponding to the depth of glue coating intended to be taken up by the roll and from which reduced portions the applying roll receives its glue, adjoining peripheries of the rollers moving in the same direction and a doctor roll for operating upon the surface of the glue-applying roll and located beyond the second roll named in the direction of movement of the surface of the glue-applying roll and having its surface adjoining the glue-applying roll moving in the opposite direction from that of the surface of the glue-applying roll to reduce and spread the film of glue thereon.

13. In a gluing machine, a glue-applying roll having grooves, a roll from which it receives its glue, a doctor roll for operating upon the surface of the glue-applying roll and adjustable toward and from the glue-applying roll, adapted to remove superfluous glue from the glue-applying roll and having its surface adjoining the glue-applying roll moving in the opposite direction from the adjoining surface of the glue-applying roll and means for adjusting the doctor roll.

14. In a gluing machine, a glue-applying roll having spaced circumferential grooves, a roll from which it receives its glue, a doctor roll adjustable toward and from the glue-applying roll, adapted to remove superfluous glue from the glue-applying roll and having its surface adjoining the glue-applying roll moving in the opposite direction from the adjoining surface of the glue-applying roll and pressure means covering the grooves and adjoining portions of the roll surface at the point of glue supply for keeping glue out of the grooves.

15. In a gluing machine, a dipping roll, a transfer roll having ribs thereon pressing against the surface of the dipping roll and receiving a film of glue between the ribs, a glue-applying roll against which the transfer roll presses, having grooves in the glue-applying roll spaced at intervals corresponding with the spacing of the ribs and narrower than the ribs and stripping fingers fitting into the grooves of the glue-applying roll.

16. In a gluing machine, a glue-applying roll, a shaft therefor, driving mechanism for the shaft, a gear upon the shaft, a doctor roll, a shaft for the doctor roll, a gear upon the shaft, an idler connecting the gears upon the glue-applying roll and doctor roll, a dipping roll, a shaft therefor, a gear upon the shaft, a second gear upon the doctor roll shaft, an idler connecting the gear upon the dipping roll shaft with the second gear, supports for the idlers, a transfer roll engaging the surfaces of the dipping roll and of the glue-applying roll, a shaft therefor and a gear upon the shaft of the transfer roll engaging one of the gears upon the shaft of the doctor roll.

17. In a gluing machine, a swinging gluing mechanism, a driving shaft therefor terminating in a clutch member, a driving clutch member therefor engaged by the first clutch member when in operative position and free therefrom when it is swung out of operative position, and means for driving the second clutch member continuously.

18. In a gluing machine, a glue applying mechanism, means for continuously rotating the rolls of this mechanism, feeding mechanism for wraps delivered to the glue applying mechanism, single-turn rotating mechanism therefor, turning the glue-applying roll one turn and a trip for the single-turn mechanism.

19. In a gluing machine, a glue-applying roll, means for supplying it with glue, a feed cylinder and feeding mechanism therefor together feeding wraps to the roll, common driving mechanism for the glue-applying roll and for the feed cylinder and gearing and independent clutches for operating either the glue-applying roll or cylinder and feeding mechanism, one independently of the operation of the other.

20. In a gluing machine, driving mechanism, a clutch gear driven thereby, gluing mechanism driven by the gear, a clutch between the gear and the gluing mechanism, feeding mechanism for delivery of wraps to be glued, feeding mechanism for carrying away the glued wraps and clutch connections between the driving mechanism and the two wrap feeding mechanisms.

21. The process of applying glue to a grooved glue-applying roll between the grooves while avoiding applying glue in and immediately about the grooves, which consists in rolling a film of glue from the glue supply, in squeezing out the glue from the film at intervals corresponding with the position of the grooves in the glue-applying roll and in rolling against the glue-applying roll the film thus freed from glue at intervals.

22. The process of regulating the amount of glue applied to the glue-rolling roll by adjacent transfer surface and regulated by a second surface, which consists in applying a coating of glue upon the glue-applying roll in excess of the amount required by a rolling movement having the same direction of movement as the adjoining surface of the glue-applying roll and in removing the excess of glue from the glue-applying roll by a rolling movement in the opposite direction to the direction of movement of the adjoining surface of the glue-applying roll and away from said roll.

23. The process of protecting gummed wraps from receiving excess of glue adjacent stripper grooves in the glue-applying roll, which consists in coating the glue-applying roll freely by contact over its entire surface, in removing the glue from the grooves at a point in the travel of the glue-applying roll beyond the point at which it is coated and in subsequently removing the excess glue from about the edges of the grooves.

24. The process of protecting gummed wraps from receiving excess of glue adjacent stripper grooves in the glue-applying roll, which consists in coating the glue-applying roll freely over its entire surface, in removing the glue from the grooves at a point in the travel of the glue-applying roll beyond the point at which it is coated and in removing the excess glue about the edges of the grooves and also across the surface of the glue-applying roll by rolling it reversely to the direction of movement to the adjoining surface of the glue-applying roll and away from the said roll.

25. The process of transferring glue from a glue dipping roll to a picker-grooved glue-applying roll by means of an intermediate roll, which consists in excluding glue from the portions of the intermediate roll which will come over the grooves by means of pressure and transferring the glue by depressions in the intermediate roll corresponding in depth to the depth of layer of glue to be transferred.

26. The process of removing excess glue from the surface of a glue-applying roll, which consists in wiping off the excess glue by a rolling movement in a direction reverse to that of the direction of movement by the surface of the roll.

27. The method of utilizing a doctor roll to remove excess glue from the adjoining surface of the glue-applying roll with respect to which the doctor roll is in adjusted position, which consists in rotating the doctor roll in a direction so that the surface adjoining the glue-applying roll moves reversely to the adjoining surface of the glue-applying roll and removing the glue picked up by the doctor roll as it rotates and at a point removed from the surface of the glue-applying roll.

ERNEST G. RIDER.
WALTER A. SAATMAN.